United States Patent [19]

Takahashi

[11] 4,100,826

[45] Jul. 18, 1978

[54] TOOL HOLDING APPARATUS IN AN NC LATHE

[76] Inventor: Taro Takahashi, No. 667-5, Oaza-Tsuchikawa, Ojiya-shi, Nigata-ken, Japan

[21] Appl. No.: 822,576

[22] Filed: Aug. 8, 1977

[30] Foreign Application Priority Data

Aug. 13, 1976 [JP] Japan .................................. 51-97371

[51] Int. Cl.² .......................... B23B 21/00; B23B 3/00
[52] U.S. Cl. ......................................... 82/25; 82/2 B; 82/21 A
[58] Field of Search .................. 82/2 R, 2 B, 2 A, 11, 82/14, 21 A, 24 R, 24 A

[56] References Cited

U.S. PATENT DOCUMENTS

| | | | |
|---|---|---|---|
| 1,514,352 | 11/1924 | Taylor et al. | 82/25 |
| 2,338,125 | 1/1944 | May | 82/25 |
| 2,467,276 | 4/1949 | Slater | 82/21 A |
| 3,156,144 | 11/1964 | Weaver | 82/14 R |
| 3,238,622 | 3/1966 | Bullard | 82/21 A |
| 3,282,138 | 11/1966 | Stockmann et al. | 82/25 |

FOREIGN PATENT DOCUMENTS 275,247  1/1928  United Kingdom .................... 82/25

*Primary Examiner*—Harrison L. Hinson
*Attorney, Agent, or Firm*—Fulbright & Jaworski

[57] ABSTRACT

An NC lathe, which comprises: a cross slide; plural tool post assemblies mounted on said cross slide in parallel with a main spindle, said tool post assembly including a lower slide post which moves on the cross slide and an upper slide post which is mounted on said lower slide post and is movable in a direction parallel to the main spindle; an oil pressure cylinder and a stop signal generator installed on said lower slide post, said oil pressure cylinder including a piston which moves within the cylinder and is associated with the upper slide post; and a means to actuate the top signal generator at the termination of forward and backward stroke of the upper slide post, which is installed on said slide post.

6 Claims, 9 Drawing Figures

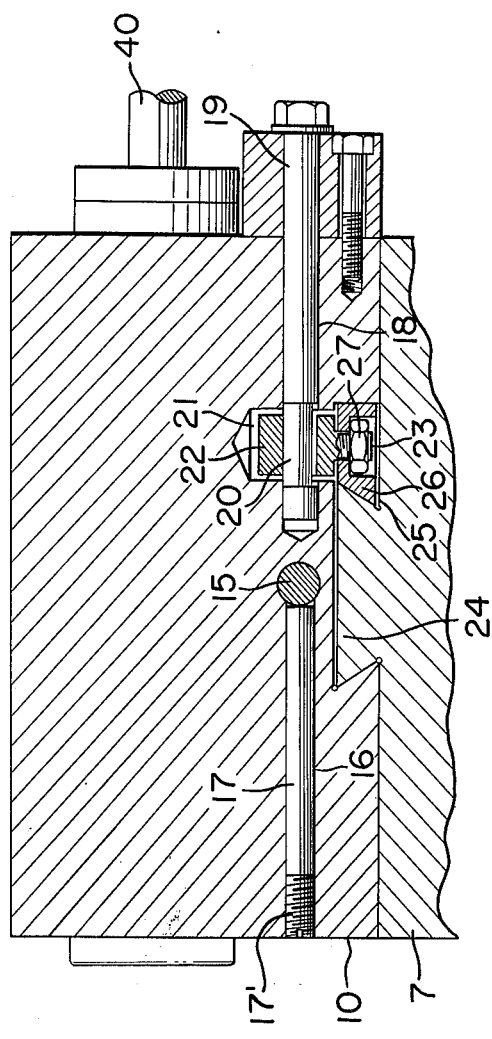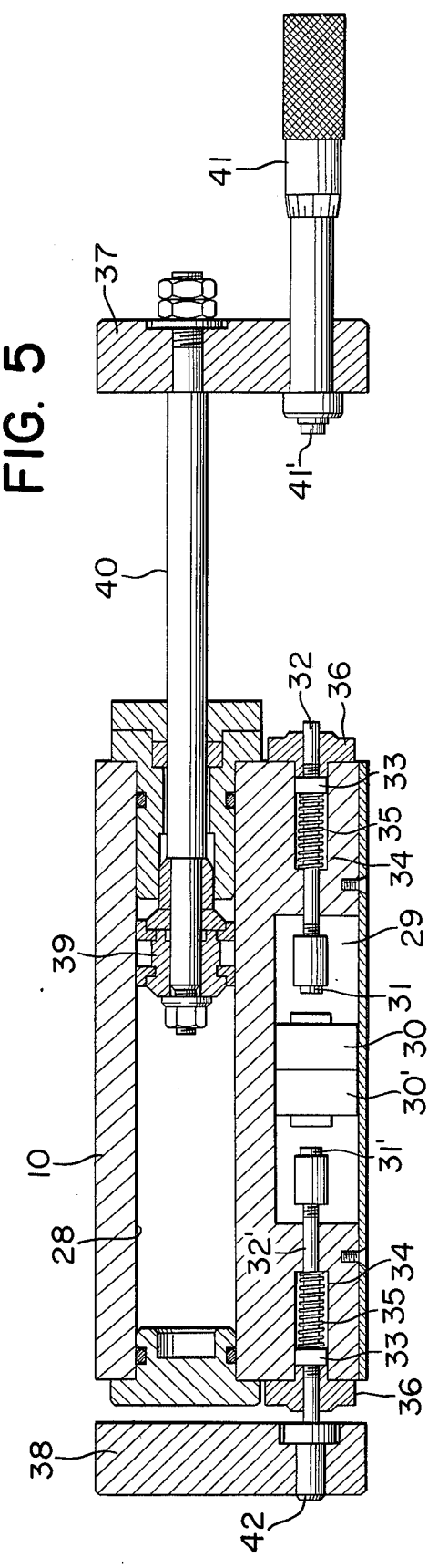

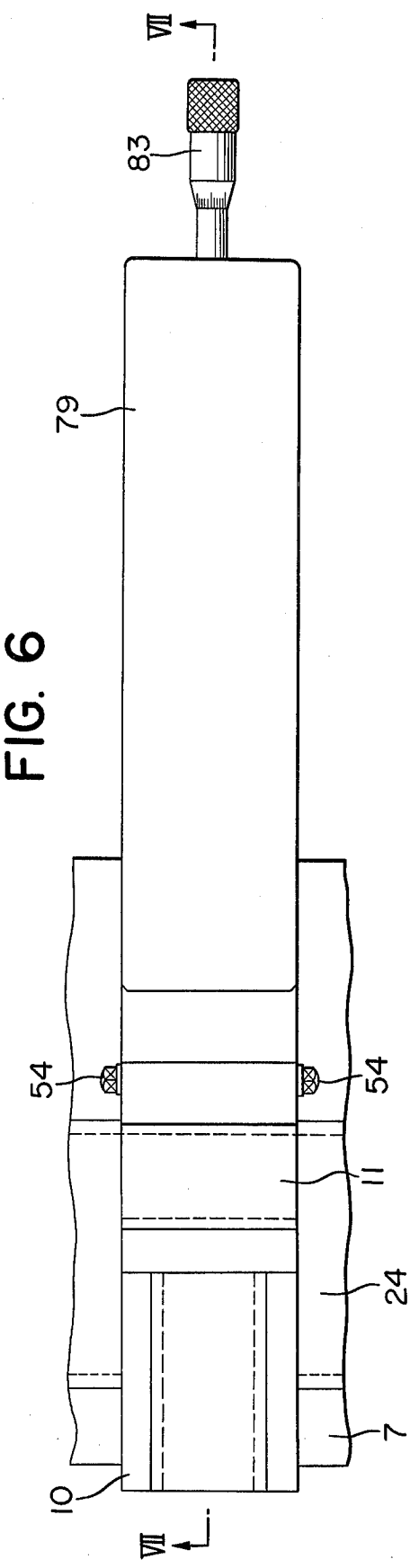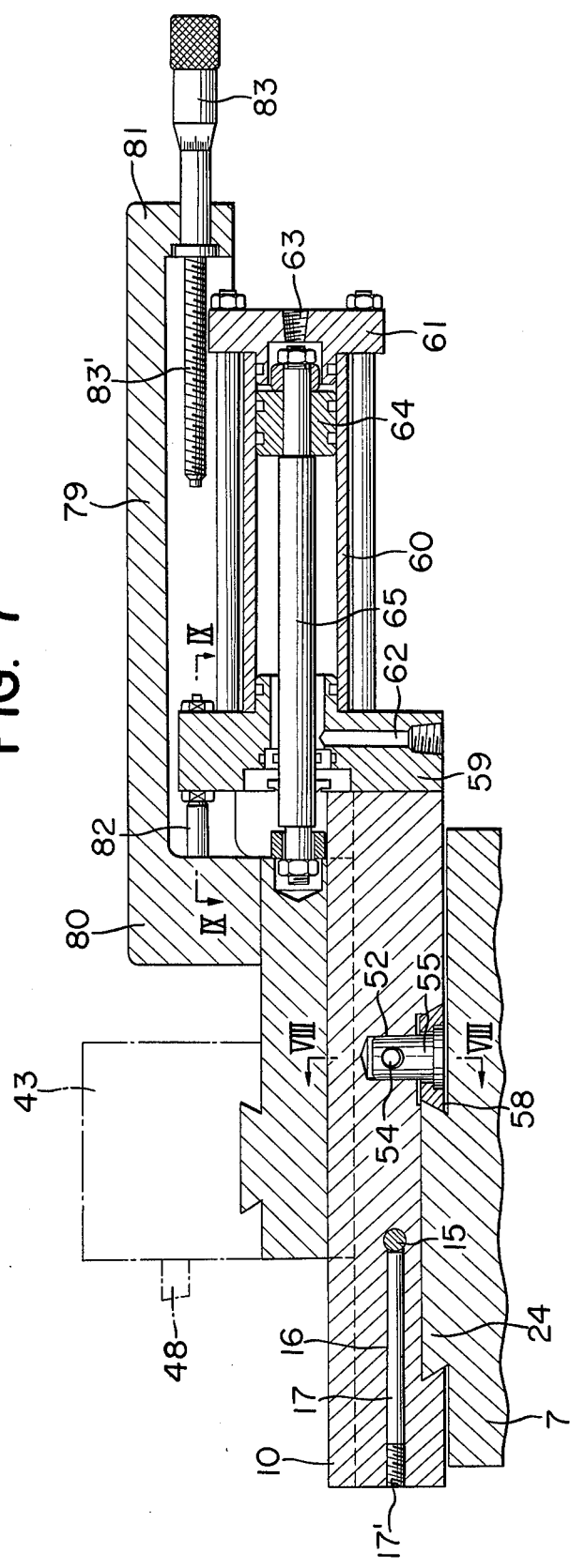
FIG. 6
FIG. 7

TOOL HOLDING APPARATUS IN AN NC LATHE

BACKGROUND OF THE INVENTION

The present invention relates to a tool holding apparatus in an NC lathe.

In the conventional tool holding apparatuses of this kind, the center of a polygonal tool post is rotatably fixed on a vertical shaft installed on a saddle, a tool is held on every side of said tool post and the tool post is clamped on said vertical shaft at the time of working. Accordingly, they have been attended with a drawback that, as often as one tool is switched over to another, it is necessary to follow the procedure that the tool post should be turned after releasing it from clamping on the vertical shaft and thereafter be clamped on the vertical shaft again, thereby wasting time in switchover of tools.

SUMMARY OF THE INVENTION

Principal object of the present invention is to eliminate the foregoing drawback of the conventional tool holding apparatuses and to provide a tool holding apparatus which comprises a cross slide and plural tool post assemblies disposed parallel to a main spindle which are mounted on said cross slide to be movable in a direction perpendicular to the main spindle, said tool post assembly including a lower slide post which moves on the cross slide in a direction perpendicular to the main spindle and an upper slide post which moves on the lower slide post in a direction parallel to the main spindle, wherein a tool is supposed to be held on the upper slide post, the switchover of the cutting work and tool can be performed only through the cross feed and transversing feed of the tool post assembly, all of such operations as clamping or release of clamping of the tool post assembly on the cross slide or rotation of the tool post assembly can be dispensed with, thereby rendering it possible to perform the work more efficiently compared with the conventional tool holding apparatuses.

Another object of the present invention is to provide a tool holding apparatus wherein an oil pressure cylinder and a stop signal generator are provided for the lower slide post, the upper slide post is connected to a piston which moves within the oil pressure cylinder and also equipped with a means to actuate the stop signal generator at the termination of forward and backward stroke thereof, the forward and backward stroke of the upper slide post is effected by putting a pressure oil in and out from the oil pressure cylinder, and a stop signal which the stop signal generator generates at the termination of forward and backward stroke of the upper slide post is sent to the NC apparatus to effect automatic stop of the tool post assembly, whereby it is rendered possible to actualize automatic control of the lathe by the NC apparatus by means of a simple mechanism.

A further object of the present invention is to provide a tool holding apparatus wherein a common adjusting rod penetrates the lower slide posts and each lower slide post is equipped with a means to fasten the adjusting rod, said adjusting rod being designed such that it is movable forwards and backwards relative to a cross slide and can be fixed at a prescribed position, whereby in the case where a delicate adjustment of the lower slide post is needed with respect to the position thereof perpendicular to the main spindle, the desired delicate adjustment of the position of the lower slide post can be realized through a simple operation of a simple structure such that the lower slide post is fastened to the adjusting rod and the adjusting rod is turned and moved in relation to the cross slide.

A still further object of the present invention is to provide a tool holding apparatus wherein a clamp bar is inserted in the contacting portion between the top face of the cross slide and the bottom face of the lower slide posts, a vertical rod installed on the upper part of the clamp bar is accommodated in a bore facing downward which is provided in the lower slide post, a horizontal bore is provided in the vertical rod, an eccentric rod portion of a horizontal rod which is provided on the lower slide post in rotatable fashion is fitted in the horizontal bore, and the clamp bar goes up and down with the rotation of the horizontal rod, whereby it is rendered possible to perform the clamping or the release of the clamping on the cross slide on the occasion of a desired delicate adjustment of the position of the lower slide post along the direction of cross feed through a simple operation of a simple structure.

Still another object of the present invention is to provide a tool holding apparatus wherein the stop signal generator consists of a proximity switch or pressure convertor, and the switch elements never come in sudden contact with one another, whereby abrasion of the switch can be prevented.

An additional object of the present invention is to provide a tool holding apparatus wherein at least one of the means to actuate the stop signal generator consists of a microstop, whereby a delicate adjustment of the feed along the longitudinal direction of the upper slide post can be performed exactly and easily.

BRIEF DESCRIPTION OF THE DRAWING

In the accompanying drawings:

FIG. 4 is an enlarged sectional view illustrative of the state of clamping of a cross slide and a lower slide post;

FIG. 5 is a sectional view taken along the line V—V in FIG. 3;

FIG. 6 is a plan of a second embodiment of a tool holding apparatus according to the present invention;

FIG. 7 is a sectional view taken along the line VII—VII in FIG. 6;

DETAILED DESCRIPTION OF THE INVENTION

Figure 1:
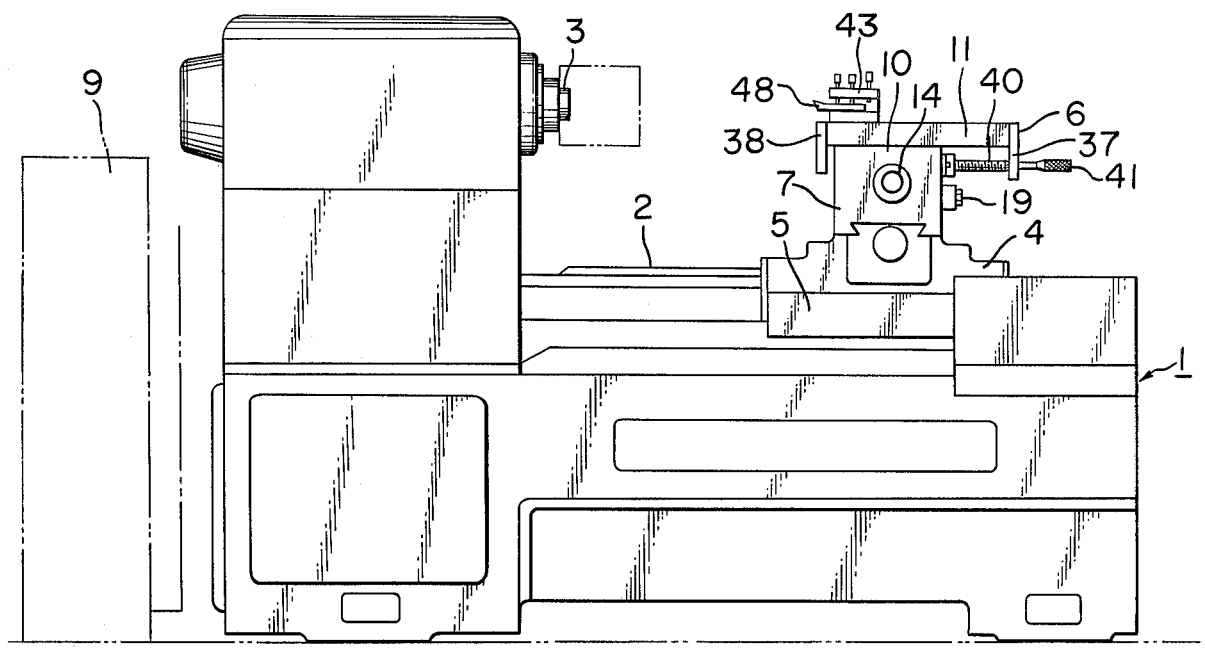
FIG. 1 is a front view of an NC lathe provided with a tool holding apparatus according to the present invention.
Figure 2:
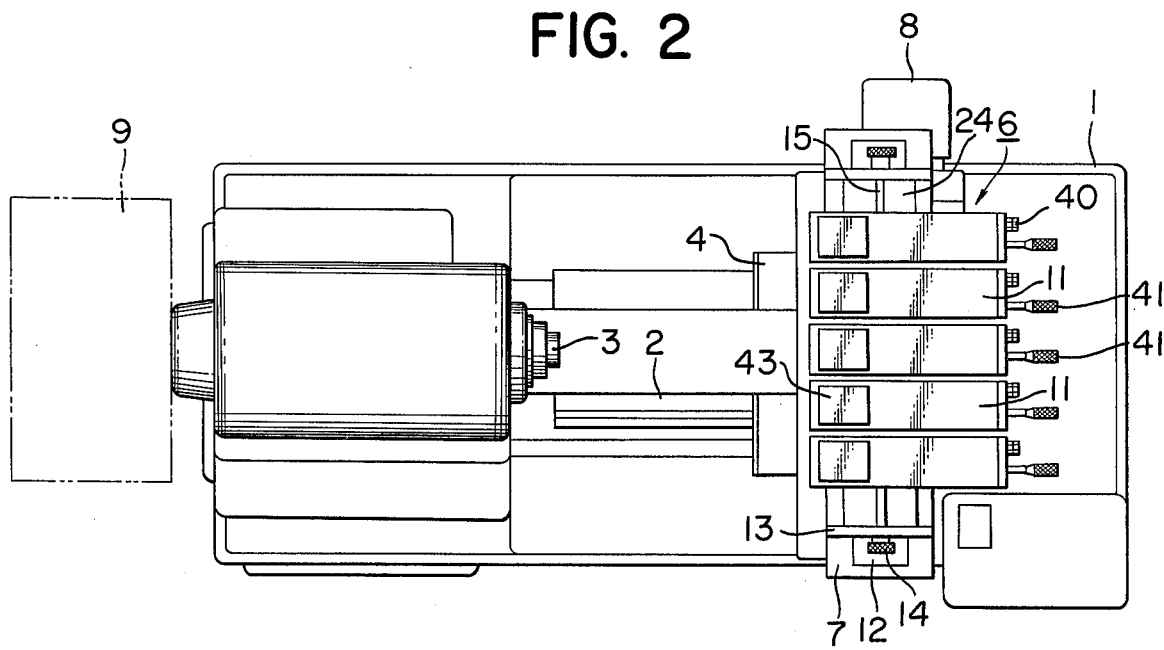
FIG. 2 is a plan of the same lathe as shown in FIG. 1.

Referring to FIG. 1 through FIG. 5 illustrating a first embodiment of the present invention, the reference numeral 1 denotes the lathe, 2 denotes the bed, 3 denotes the main spindle, 4 denotes the saddle, 5 denotes the apron, 6 denotes the tool post assembly, 7 denotes the cross slide, 8 denotes the motor to actuate the cross slide 7, and 9 denotes the NC apparatus.

The tool post assembly 6 is installed in a set of plural assemblies (exemplified in the drawings is a set of 5 assemblies), and each assembly comprises a lower slide post 10 which slides on the cross slide 7 in the longitudinal direction and an upper slide post 11 which is disposed above said lower slide post 10 and slides in a direction perpendicular thereto.

The cross slide 7 is equipped with an adjusting means 12, and this adjusting means 12 includes a nut 14 which is rotatably supported on a bracket 13 provided on one end of the cross slide 7 and an adjusting rod 15 which has its one end, to wit, threaded portion, screwed in said nut 14 and penetrates the bracket 13 and the lower slide post 10 in rotatable fashion.

The lower slide post 10 is provided with a horizontal bore 16 disposed confronting the rod 15 as illustrated in FIG. 4, and the entrance portion of this bore 16 is provided with a screw thread. In the bore 16 is rotatably inserted a fastening rod 17, and a threaded portion 17' provided on the rear end of the fastening rod 17 is screwed in the threaded portion of the entrance of the bore 16, whereby the rod 15 can be fastened by means of the fore end of the fastening rod 17.

Further, the lower slide post 10 is provided with another bore 18 disposed on the opposite side of the bore 16 and parallel thereto as illustrated in FIG. 4, and in this bore 18 is rotatably inserted a rod 19 having an eccentric rod portion 20 formed on a part close to the fore end thereof.

A bore 21 which is perpendicular to the bore 18 and its lower part opens to the bottom face of the lower slide post 10 is provided, the eccentric portion 20 is disposed within the bore 21, a bush 22 fitted on the eccentric portion 20 is disposed within the bore 21, and a threaded rod 23 is provided on the bottom face of the bush 22. Between a dovetail mount 24 of the cross slide 7 and the lower slide post 10 confronting the cross slide 7 is formed a space portion 25 whose upper part interconnects with the opening of the bore 21. In the space portion 25 is inserted a trapezoidal clamp bar 26, the threaded rod 23 penetrates a bore provided in the top of the clamp bar 26, and a nut 27 is applied on the rod 23, thereby setting the clamp bar 26 on the bush 22.

Besides, in the lower slide post 10 is formed an oil pressure cylinder 28 parallel to the main spindle 3 as illustrated in FIG. 5, a chamber 29 is formed practically in parallel therewith, and proximity switches 30 and 30' facing in opposite directions are disposed in the practical center of the chamber 29. The rods 32 and 32' having their fore end equipped with magnets 31 and 31' respectively and confronting the proximity switches 30 and 30' respectively are slidably disposed on the side wall of the lower slide post 10. In the middle of the respective rods 32 and 32' is provided a flange 33, and in an enlarged bore 34 wherein the flange 33 is inserted is accommodated a spring 35 which winds round the rods 32 and 32' and presses them toward the outside. The opening of the bore 34 is equipped with the bearing pads 36 and 36', the rods 32 and 32' penetrate these pads 36 and 36' and are supported thereby, and the fore ends of the rods 32 and 32' project from the pads 36 and 36' at the time when the flange 33 engages with the pads 36 and 36'.

On the fore and rear ends of the upper slide post 11 are provided the brackets 37 and 38, and on the bracket 37 disposed on the opposite side of the main spindle 3 thereof is fixed the end of the piston rod 40 of the piston 39 which slides within the cylinder 28. On the portion of the bracket 37 confronting the rod 32 is provided a microstop 41, while on the portion of the bracket 38 confronting the rod 32' is provided a stopper 42.

Figure 3:
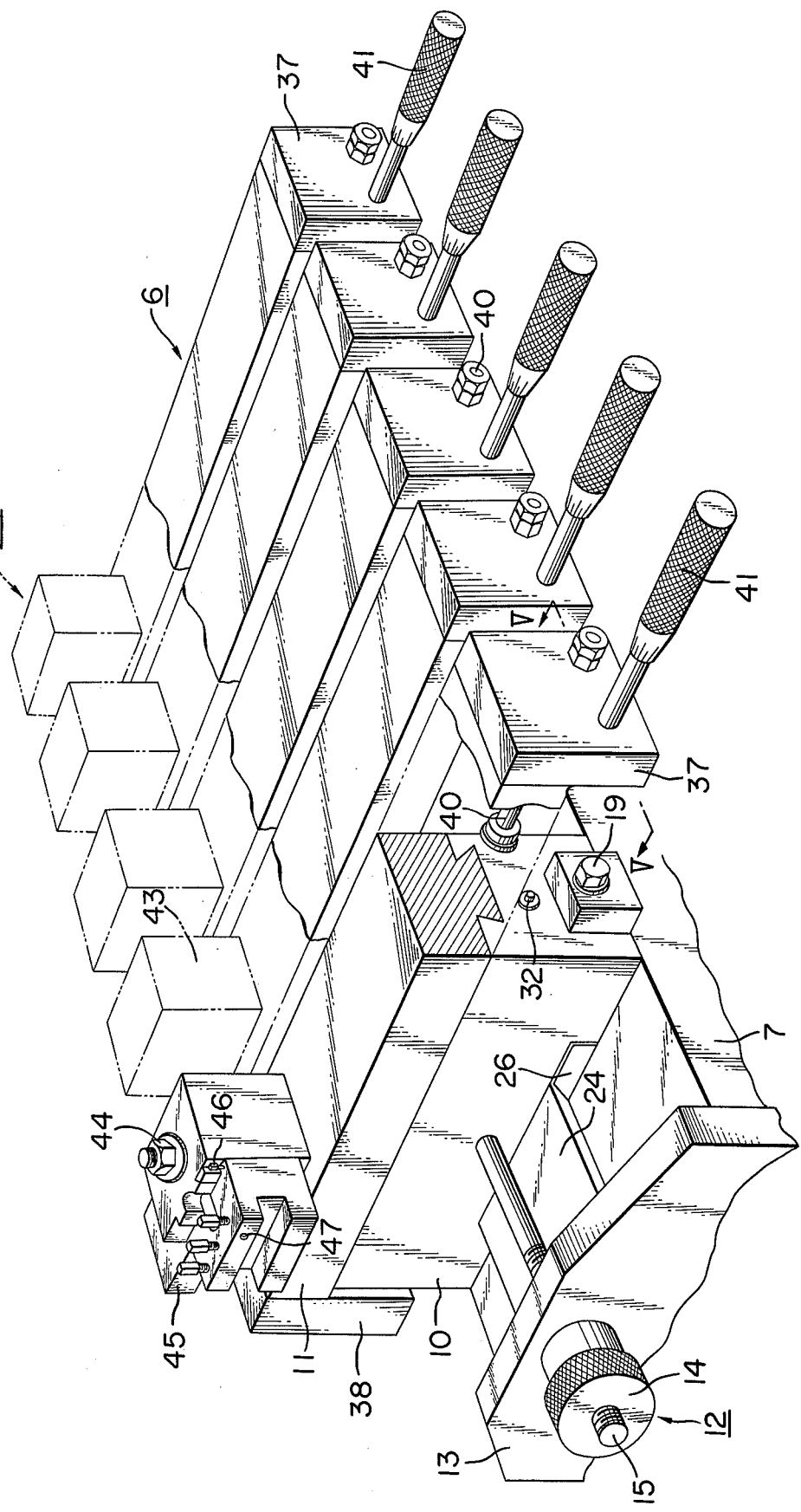
FIG. 3 is a perspective view of a first embodiment, partly broken away, of a tool holding apparatus according to the present invention.

Further, on the fore end of the upper slide post 11 is fixed a tool post 43 with a bolt-nut 44 as illustrated in FIG. 3, and on the side of the tool post 43 is attached a tool holder 45 in vertically slidable fashion. The adjustment of the vertical position of said tool holder 45 is performed by means of an adjusting bolt 46, and the fixing of the tool holder 45 at a prescribed position is performed by means of a bolt 47. 48 denotes the tool.

In the above described apparatus, each tool post assembly is equipped with a tool different from one another, a tool post assembly 6 needed is moved to a required position by actuating the motor 8 by means of the NC apparatus 9, the oil pressure operation by an oil pressure control system not shown in the drawings is effected on the oil pressure cylinder in the assembly 6, and a required cutting work is performed on a work piece by means of a tool supported on the upper slide post 11 with the forward and backward movement thereof.

With the progress of the foregoing cutting work, the upper slide post 11 of the tool post assembly 6 moves to the left in FIG. 3, the brackets 37 and 38 on both ends thereof also advance leftward in FIG. 5. In the proximity of the terminal of this stroke, the fore end of the spindle 41' of the microstop 41 engages with the tip of the rod 32 and moves it leftward in defiance of the pressure of the spring 35, and when the magnet 31 provided on the tip thereof approaches to the proximity switch 30, said switch 30 sends a stop signal to the NC apparatus 9 and, conjointly with the contact of the tip of the spindle 41' of the microstop 41 with the bearing pad 36 thereafter, stops the advance of the tool post assembly 6. A delicate adjustment of the stop position on this occasion is performed by operating the microstop 41.

Subsequently, by means of the NC apparatus, the tool post assembly 6 retreats to the left in the drawings, and when the spindle 41' disengages from the rod 32, the rod 32 retreats to the right by dint of the spring 35 and the magnet 31 withdraws from the switch 30.

When the upper slide post 11 retreats by a prescribed distance in this way and the magnet 31' disposed on the left side approaches to the other switch 30' by dint of the stopper 42, the siwtch 30' sends a stop signal to the NC apparatus and, conjointly with the contact of the stopper 42 with the bearing pad 36' thereafter, stops the retreat of the tool post assembly 6 and make it restore the initial position thereof.

When it is desired to effect a delicate adjustment of the position of the tool 48 along the direction perpendicular to the main spindle 3 on the occasion of performing the foregoing operation, referring to FIG. 4, the adjusting rod 15 is fastened with the tip of the fastening rod 17 of the lower slide post 10 of the tool post assembly 6 equipped with a pertinent tool 48 by screwing said rod 17 in on one hand, and the rod 19 is turned by about 180° to lower the bush 22 elevated in FIG. 4, thereby releasing the clamping of the dovetail mount 24 by the clamp bar 26 and turning the nut 14 illustrated in FIG. 3 on the other hand. By virtue of thus turning the nut 14, the adjusting rod 15 engaged therewith moves to the right and left in FIG. 3 and the lower slide post 10 integrated therewith through the fastening rod 17 moves. When the tool post assembly 6 has moved by a prescribed distance in this way, the fastening of the rod 15 by the fastening rod 7 is released and, at the same time, the bush 22 is elevated with the rotation of the rod 19 and the dovetail mount 24 is clamped again by the clamp bar 26.

In FIG. 6 through FIG. 9 is shown a second embodiment of the tool post assembly different from the foregoing embodiment. As some parts of this embodiment are similar to that of the first embodiment, explanation thereof will be replaced by quotation of the marks used in the first embodiment, and the parts having a structure different from that in the first embodiment will be exclusively elucidated in the following.

The lower slide post 10 is provided with a horizontal bore 51 which is disposed on the opposite side of the bore 16 and perpendicularly thereto, and is further provided with a vertical bore 52 making a right angle with said horizontal bore 51. The lower part of the bore 52 opens to the bottom face of the lower slide post 10. In the bore 51 is rotatably inserted a rod 54 having an eccentric rod portion 53 formed in the middle thereof. The eccentric rod portion 53 is disposed within the bore 52, and in the bore 52 is further inserted the leg portion of the clamp means 55 in vertically movable fashion, said leg portion being provided with a horizontal bore 56, and in this bore 56 is rotatably fitted the eccentric rod portion 53. The clamp means 55 is provided with an annular flange 57. In a space formed in between the cross slide 7 and the lower slide post 10 is inserted the clamp bar 58, the leg portion of the clamp means 55 penetrates the clamp bar 58, and the flange 57 of the clamp means 55 fits in an annular seat provided on the bottom face of the clamp bar 58.

Further, on the bracket 59 fixed to the rear end of the lower slide post 10 is equipped an oil pressure cylinder 60 as shown in FIG. 7, and in the bracket 59 and the end plate 61 disposed on the side opposite thereto are provided the liquid passages 62 and 63, respectively. The tip of the piston 64 fitted in the cylinder 60 is connected to the rear end of the upper slide post 11.

Figure 9:
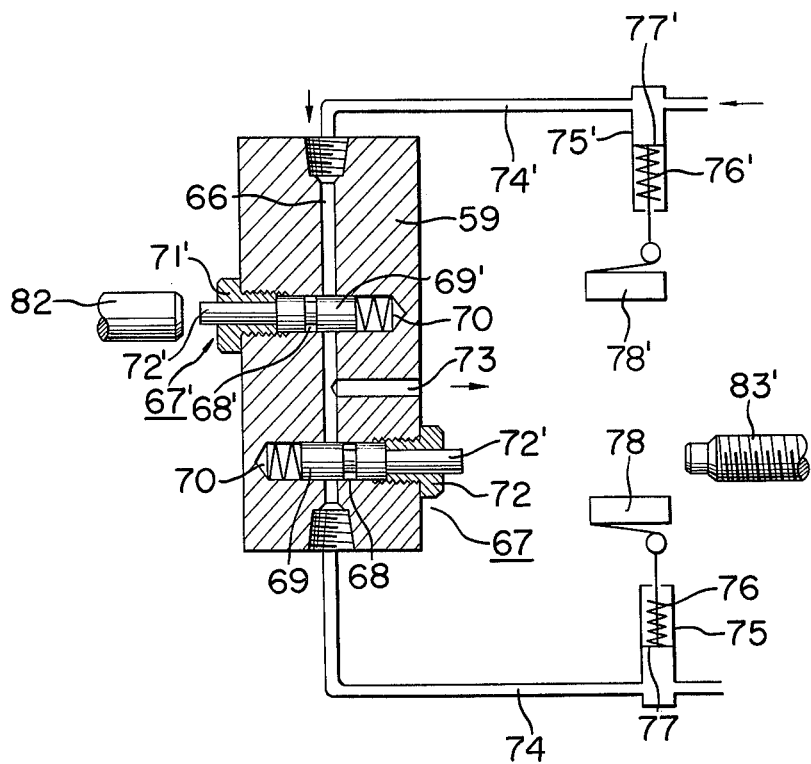
FIG. 9 is a sectional view taken along the line IX—IX in FIG. 7.

In the bracket 59 is provided an air passage 66 which is practically perpendicular to the direction of movement of the piston 64, and said air passage is to be opened and closed by the slide valve means 67 and 67' disposed to be practically perpendicular thereto. These valve means 67 and 67' are opposite in their directions, but are of the same structure. This means comprises a valve body 69, 69' with an annular passage 68, 68' formed in the center thereof. These valves 69 and 69' are pressed by a spring 70 accommodated in a bore wherein the tip of valve is fitted, whereby they are always held in a position such that the passages 68 and 68' be in discord with the passage 66 as illustrated in FIG. 9. And, in this position, the rods 72 and 72' provided on the heads of the valves 69 and 69' penetrate the bearing pads 71 and 71', respectively, as fixed in the bores, and the tips thereof project to the outside. An air vent 73 crossing the air passage 66 in the middle of the valve means 67 and 67' is bored in the bracket 59. Both openings of the passage 66 are connected to an air pressure source not shown in the drawings by means of the pipes 74 and 74', respectively, the cylinders 75 and 75' are connected to an appropriate place of the pipes 74 and 74', respectively, the springs 76 and 76' are accommodated in the cylinders 75 and 75', respectively, by disposing on the side opposite to the air side with the pistons 77 and 77' interposed, and the piston rods are connected to the electric switches 78 and 78' respectively, whereby this means constitutes a pressure convertor.

A stopper bracket 79 extending from the upper slide post 11 is provided along the cylinder 60, and on both end plates 80 and 81 of the bracket 79 are provided the stopper 82 and microstop 83 confronting the two rods 72 and 72' respectively.

In the foregoing second embodiment, with the progress of the cutting work, the upper slide post 11 moves to the left in FIG. 7, and in the proximity of the terminal of this stroke, the tip of the spindle 83' of the microstop 83 engages with the end of the rod 72 and moves it leftward in defiance of the pressing force of the spring 70. When this rod 72 moves and the annular passage 68 thereof agrees with the air passage 66 to open the valve means 67, air from the pipe 74' is released to the atmosphere by way of the passages 66 and 68 and the vent 73, and accordingly, the air pressure within the pipe 74 decreases. By virtue of this decrease in air pressure, the piston 77 within the cylinder 75 is pressed by the spring 76 and moves leftward, and by the movement of the piston rod accompanying therewith, the switch 78 is actuated to send a stop signal thereof to the NC apparatus and thereafter stop the advance of the tool post assembly conjointly with the contact of the tip of the spindle 83' of the microstop 83 with the bearing pad 71.

Then, the NC apparatus works in the same way as in the first embodiment, the upper slide post 11 retreats, the stopper 82 engages with the end of the rod 72' to press it, the valve means 67' opens, and the switch 78 is actuated. At this, the NC apparatus works to stop the retreat of the post 11 conjointly with the engagement of the stopper 82 with the pad 71', whereby the tool post assembly is restored to its initial position.

Figure 8:
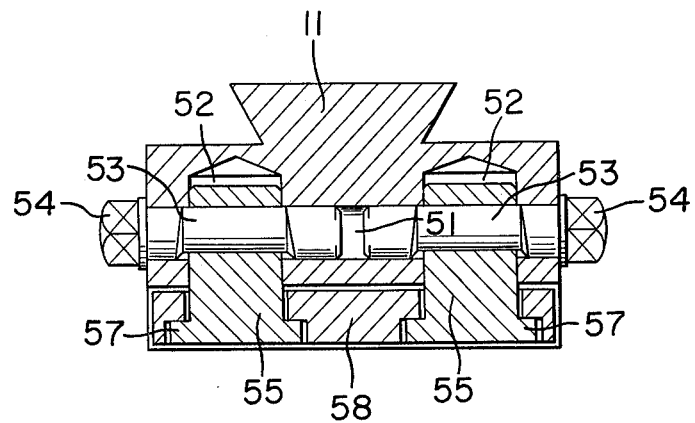
FIG. 8 is a sectional view taken along the line VIII—VIII in FIG. 7.

On the occasion of performing such a work, in order to effect a delicate adjustment of the position of the tool along a direction perpendicular to the main spindle 3, the rod 54 is turned by about 180° to lower the clamp means 55 which has been raised as shown in FIG. 8 by means of the eccentric rod portion 53, whereby the clamping of the dovetail mount 24 by the clamp bar 58 is released.

Operations other than the foregoing are all the same as in the first embodiment.

What is claimed is:

1. A tool holding apparatus in an NC lathe, which comprises a cross slide; plural tool post assemblies which are mounted on said cross slide in parallel with a main spindle and to be movable independently of one another in a direction perpendicular to the main spindle, said tool post assembly including a lower slide post which is movable on the cross slide and an upper slide post which is mounted on said lower slide post and is movable in a direction parallel to the main spindle; an oil pressure cylinder and a stop signal generator for sending a stop signal to the NC apparatus which are installed on said lower slide post, said oil pressure cylinder including a piston which moves in the cylinder and is associated with the upper slide post; and a means provided in the upper slide post so as to actuate the stop signal generator at the termination of forward and backward stroke of said post.

2. A tool holding apparatus according to claim 1, wherein a common adjusting rod penetrates said lower slide posts, each lower slide post is equipped with a means of fastening the adjusting rod, and the adjusting rod is set on a cross slide to be capable of forward and backward movement and to be settled on a prescribed position.

3. A tool holding apparatus according to claim 1, wherein a clamp bar is provided in a place where the top face of the cross slide contacts with the bottom faces of the lower slide posts, a vertical rod installed on the upper part of the clamp bar is accommodated in a bore facing downward which is provided in the lower slide post, a horizontal bore is provided in the vertical rod, and an eccentric rod portion of a rod provided on the lower slide post horizontally and in rotatable fashion is fitted in said bore, whereby the clamp bar moves vertically with the rotation of the rod so as to clamp the lower slide post on the cross slide or release said clamping.

4. A tool holding apparatus according to claim 1, wherein said stop signal generator consists of a proximity switch means.

5. A tool holding apparatus according to claim 1, wherein said stop signal generator consists of a pressure convertor, said pressure convertor comprising a valve means consisting of two air passages opening to the atmosphere and having two switching valves working separately as set on the passages, a pressure switch provided on an appropriate place of the pipe for supplying pressure air, and a pressure air source for supplying pressure air to the pipe, and the valve means is to be actuated by a stopper provided on the upper slide post.

6. A tool holding apparatus according to claim 4, wherein at least one of the means to actuate said stop signal generator consists of a microstop.

* * * * *